United States Patent [19]

Pouring

[11] Patent Number: 4,592,331

[45] Date of Patent: Jun. 3, 1986

[54] COMBUSTION PROCESS FOR I.C. ENGINE USING A RESONATING AIR CHAMBER IN A RECIPROCATING PISTON TO INDUCE CLOSED ORGAN PIPE RESONANCE IN THE COMBUSTION CHAMBER

[75] Inventor: Andrew A. Pouring, Edgewater, Md.

[73] Assignee: Sonex Research Inc., Annapolis, Md.

[21] Appl. No.: 535,338

[22] Filed: Sep. 23, 1983

[51] Int. Cl.⁴ ............................................. F02B 17/00
[52] U.S. Cl. ................................ 123/660; 123/193 P; 123/434; 123/279
[58] Field of Search ....................... 123/192 P, 26, 436, 123/660, 276, 279, 434, 585, 586

[56] References Cited

U.S. PATENT DOCUMENTS

| | | |
|---|---|---|
| 2,573,536 | 10/1951 | Bodine, Jr. |
| 2,662,514 | 12/1953 | Bodine, Jr. |
| 2,662,516 | 12/1953 | Bodine, Jr. |
| 4,167,930 | 9/1979 | McNair, Jr. |
| 4,221,198 | 9/1980 | McNair, Jr. |
| 4,370,959 | 2/1983 | McNair, Jr. |
| 4,465,033 | 8/1984 | Blaser ................................. 123/295 |

FOREIGN PATENT DOCUMENTS

| | | |
|---|---|---|
| 2745923 | 4/1978 | Fed. Rep. of Germany ... 123/193 P |
| 49-113008 | 10/1974 | Japan . |
| 351633 | 7/1931 | United Kingdom . |

OTHER PUBLICATIONS

Blaser, R. F., "Heat Balanced Cycle," USNA, Division of Engineering and Weapons, (1974), Sep. 74.

Blaser, R. et al., "The Naval Academy Heat Balanced Engine (NAHBE)," USNA Report E.W. 8-76 (1976), Jun. 76.

Blaser, R. F., "USNA NAHBE I-Truck Utility ¼ Ton 4×4 M 151-A Retrofitting Implementation Feasibility Research & Development," Report No. N00161-1 (1976-1977), Sep. 77.

Adams, J. A., "Heat Transfer Analysis of the NAHBE Piston Cap," USNA Engineering and Weapons Report EW-11-77 (1977), Sep. 77.

Pouring, A. A. et al., "The Influence of Combustion with Pressure Exchange on the Performance of Heat Balanced Internal Combustion Engines," SAE Technical Paper No. 770120 (1977), Feb. 77.

Pandalai, R. P., "Preliminary Investigation of the Nonsteady Combustion and Flow Processes of the Naval Academy Heat Balanced Engine (NAHBE)," USNA Report EW-10-78 (1978), May. 78.

Keating, E. L. et al., "Quasi-Equilibrium Air Standard Heat Balanced Cycle Analysis," SAE Technical Paper No. 789036 (1978), Oct. 78.

Adams, J. A., "Heat Transfer Analysis of the NAHBE Piston Cap, Part II—An Extension," USNA Report EW-6-79 (1979), Feb. 79.

Hickling, R. et al., "Knock-Induced Cavity Resonances in Open Chamber Diesel Engines," J. Acoust. Soc. Am., vol. 65, No. 6, pp. 1474–1478 (1979), Jun. 79.

Failla, C. C. et al., "Parametric Variations of a Heat Balanced Engine," USNA Report No. EW-12-79 (1979), Sep. 79.

Keating, et al., "Quasi Equilibrium Fuel-Air Heat Balanced Cycle Analysis," USNA Report No. EW-14-79 (1979), Nov. 79.

Pouring, A. A. et al., "Time Dependent Analytical and Optical Studies of Heat Balanced Internal Combustion Engine Flow Fields," USNA Report No. EW-13-80 (1980), Nov. 80.

(List continued on next page.)

*Primary Examiner*—Parshotam S. Lall
*Attorney, Agent, or Firm*—Bacon & Thomas

[57] ABSTRACT

Closed organ pipe resonance is induced in the cylinder of a piston I.C. engine by using a resonating mass of gas in a chamber in the piston adjacent its working face, the chamber and cylinder volume being connected by a restricted orifice. The organ pipe resonance is induced during the expansion part of the combustion cycle to cause intimate mixing of the reacting fuel and air charge.

3 Claims, 29 Drawing Figures

OTHER PUBLICATIONS

Johnson, W. H., "Optimizing the NAHBE Piston Cap Design Utilizing Schlieren Photography Methods and Applications of the Helmholtz Resonator Theory," USNA Trident Scholar Project Report No. 112 (1981), Jun. 81.

Pouring, A. A. et al., "Time Dependent Analytical and Optical Studies of Heat Balanced Internal Combustion Engine Flow Fields" First Specialists Conference of the Combustion Institute, Bordeaux, France (1981), Jul. 81.

Hickling, R. et al., "Cavity Resonances in Engine Combustion Chambers and Some Applications J. Acoust. Soc. Am., vol. 73, No. 4, pp. 1170–1178 (1983), Apr. 83.

Keating, E. L., "Internal Regenerative Air Standard I.C. Engine Cycle Performance," AIAA/SAE/ASME 18th Joint Propulsion Conference Report No. AIAA-82-1281 (1982), Jun. 82.

Allen, J. et al., "Heat Balanced I.C. Engine Transition Studies," AIAA/SAE/ASME 18th Joint Propulsion Conference, Report No. AIAA-82-1116 (1982), Jun. 82.

$$RQI = \frac{IHP(K)}{ISFC \cdot UHC \cdot CO}$$

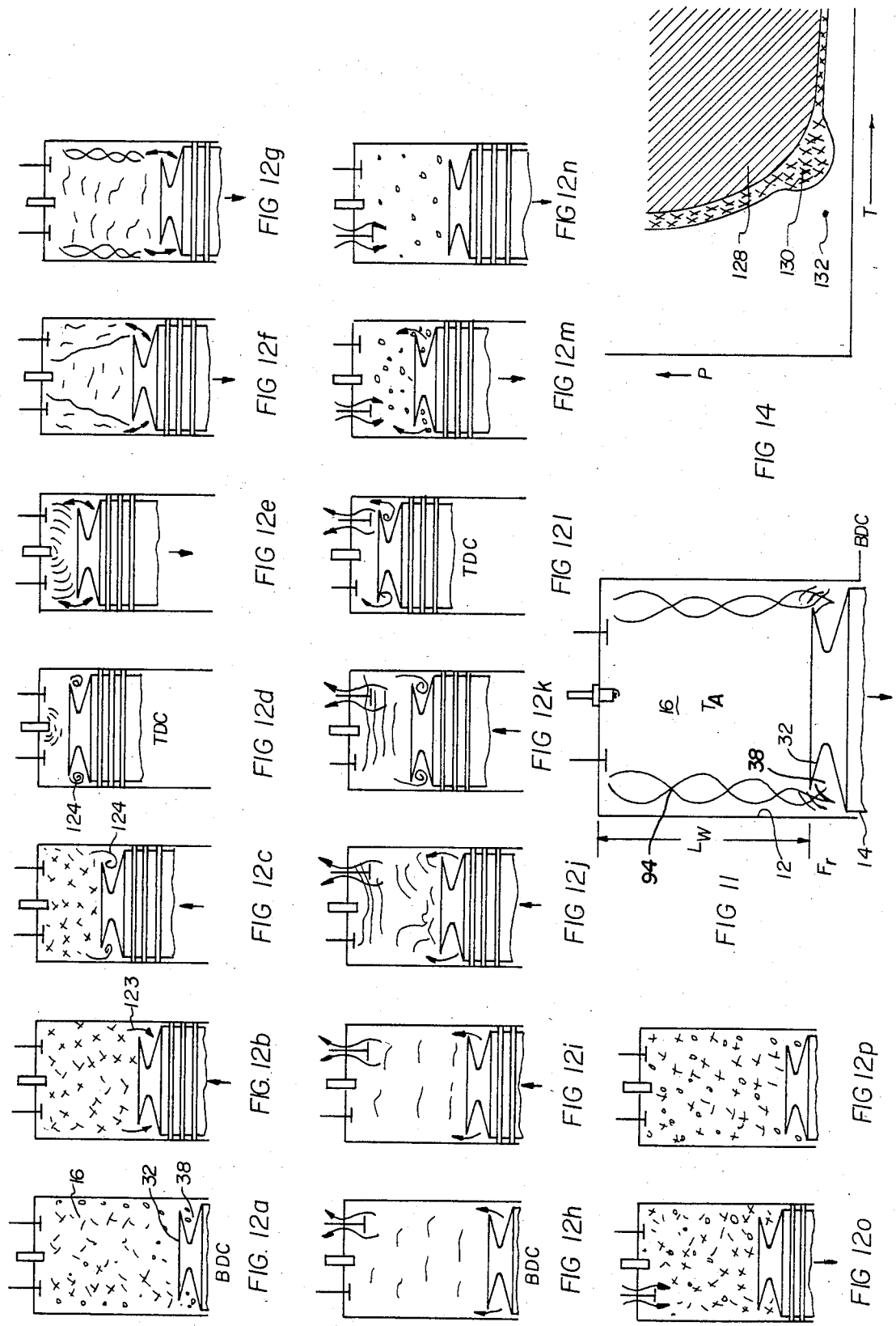

COMBUSTION PROCESS FOR I.C. ENGINE USING A RESONATING AIR CHAMBER IN A RECIPROCATING PISTON TO INDUCE CLOSED ORGAN PIPE RESONANCE IN THE COMBUSTION CHAMBER

FIELD OF THE INVENTION

This invention is in the field of internal combustion engines and in particular is a combustion process wherein closed organ pipe resonance of a variable volume working chamber is induced by a resonating air chamber in the piston.

DESCRIPTION OF THE PRIOR ART

The basic combustion process underlying the invention involves the use of combustion wave energy to drive an air chamber in the piston of an I.C. piston engine in resonance to cause previously stored air in the air chamber to be literally dynamically pumped into the combustion chamber in a totally passive manner while the combustion/expansion part of the engine operating cycle is occurring, such pumping effect occurring even independently of the total average pressure differential between the air and combustion chambers. This process generally has been previously described in the published literature relating to the Naval Academy Heat Balanced Engine (NAHBE). See for example: United States Naval Academy Progress Report No. EW 8-76 entitled: "The Naval Academy Heat Balanced Engine (NAHBE)" by Blaser, Pouring, Keating and Rankin (June, 1976); United States Naval Academy Trident Scholar Report No. TSPR No. 112, (1981) entitled "Optimizing the NAHBE Piston Cap Design Utilizing Schlieren Photography Methods and Applications of the Helmholtz Theory" by William H. Johnson (June 2, 1981); United States Naval Academy Program Report No. EW-13-80 entitled: "Time Dependent Analytical and Optical Studies of Heat Balanced Internal Combustion Engine Flow Field" by Pouring and Rankin (November, 1980); United States Naval Academy Progress Report No. EW-10-78 entitled: "Preliminary Investigation of the Non-Steady Combustion and Flow Process of the Naval Academy Heat Balanced Engine (NAHBE)," (June, 1978), and United States Naval Academy Progress Report No. EW-12-79 entitled "Parametric Variations of a Heat Balanced Engine" by Failla, Pouring, Rankin and Keating. (September, 1979).

More recent studies have indicated that it is possible to use the resonating air chamber in the piston as an energy source to drive the working chamber volume in a closed organ pipe resonance at a fundamental frequency at least during a portion of the combustion cycle when the length of the cylinder open volume is suitable to respond to the driving frequency in the air chamber. This results in agitation and intense mixing of the reacting charge during the expansion part of the combustion/reaction cycle and improves the reaction process, particularly the end portion of the reaction.

BRIEF SUMMARY OF THE INVENTION

This invention is a process for carrying out a cyclic combustion reaction of fuel and air in a variable volume bore of an internal combustion engine constituting a working chamber in which the fuel is reacted to convert chemical energy into heat energy for producing work by expansion of products of combustion against the working face of a piston reciprocable in the bore. A Helmholtz resonating chamber is provided in the piston adjacent its working face, the chamber including a restricted orifice in communication with the working chamber and an enlarged volume in communication with the orifice, the dimensions of the enlarged volume and orifice being such that the Helmholtz resonating frequency of the chamber corresponds approximately to the frequency of the shock waves generated upon initiation of combustion of the fuel in the working chamber, and all linear dimensions of the orifice and chamber are less than $\frac{1}{4}$ wavelength of said frequency at the approximate temperature of the resonating chamber during combustion and expansion of the fuel in the working chamber. A fuel and air charge is supplied to the working chamber and compressed while a portion of the air part of the charge is transferred into the resonating chamber during compression. The fuel and air mixture is ignited and reacted in the working chamber to produce heat and work, and the air is heated in the resonating chamber by heat exchange with the products of reaction. The heated air in the resonating chamber is excited at its Helmholtz resonant frequency during each combustion reaction event in the working chamber by said shock waves to cause periodic pumping of heated air from the resonating chamber into the working chamber throughout the combustion/expansion events, and closed organ pipe resonance of the gas in the working chamber is induced after each initiation of the combustion reaction in the working chamber by the periodic flow of air from the resonating chamber into the working chamber through said orifice at said Helmholtz resonant frequency.

DESCRIPTION OF THE DRAWINGS

FIG. 11 is a schematic illustration of closed organ pipe resonance induced in the working chamber by the resonating piston air chamber;

FIGS. 12(a-p) depicts an operational cycle of an engine incorporating the invention;

FIG. 14 is a graphical representation showing the correlation between combustion chamber pressure and temperature, autoignition zone of the charge in the chamber, and radical enhanced autoignition zone of the charge in the chamber.

DESCRIPTION OF PREFERRED EMBODIMENT OF THE INVENTION

Figure 2:
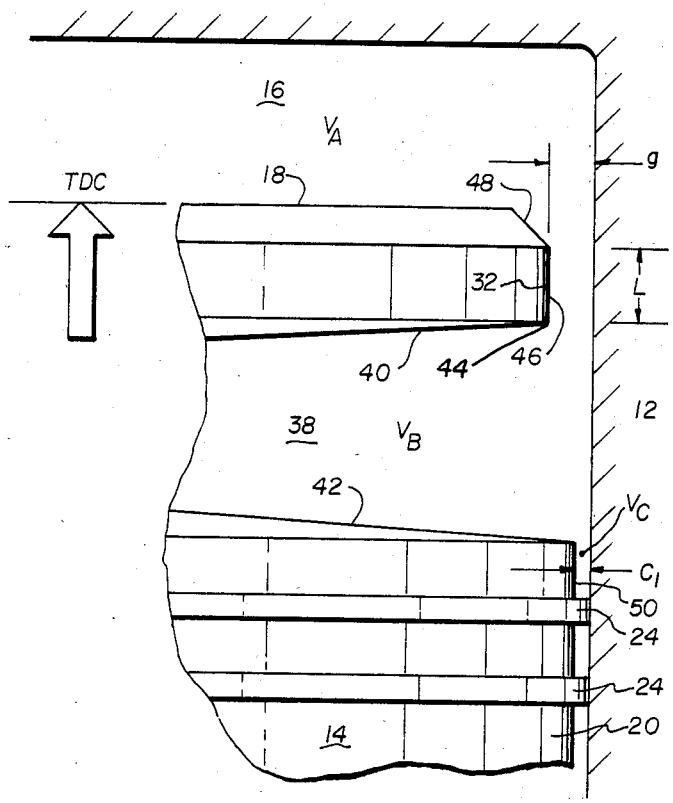
FIG. 2 is an elevational view of the piston of FIG. 1 within a cylindrical bore of the engine.
Figure 1:
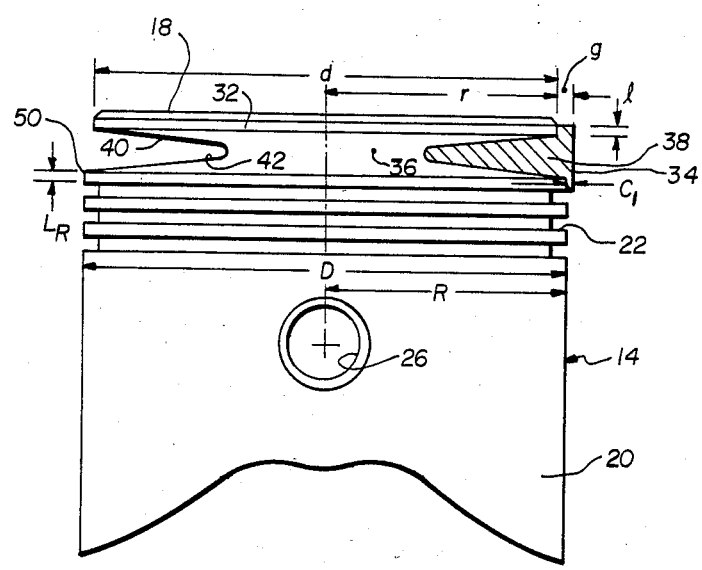
FIG. 1 is an elevational view of a piston for an I.C. engine incorporating this invention.
Figure 3:
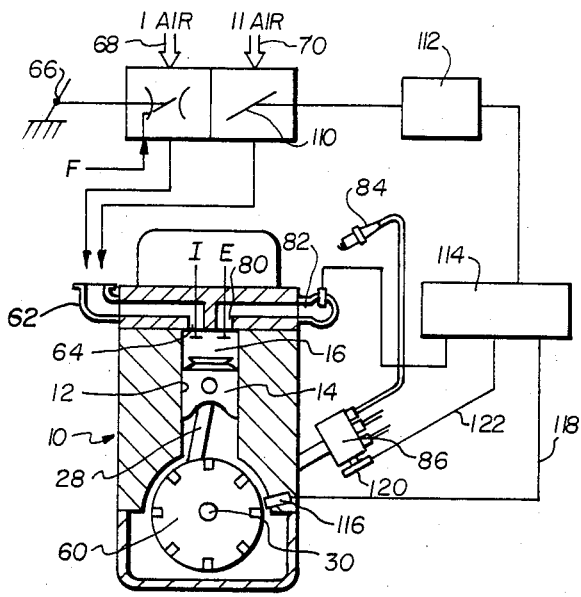
FIG. 3 is a schematic representation of a fuel-aspirated I.C. engine incorporating the piston of FIG. 1 and with an air to fuel ratio control system.

With reference to the drawings, in particular FIGS. 1, 2 and 3, the present invention contemplates an improvement to an internal combustion engine 10 having a cylinder or bore 12 with reciprocating piston 14 therein operable over a working cycle including charge intake, compression, combustion/expansion and exhaust events. The engine may be naturally aspirated, supercharged (intake air pressurized), carbureted or fuel injected, or any combination of the foregoing, and the charge is normally a mixture of suitable hydrocarbon fuel and air, all as is well-known in the field of internal combustion engines. The specific preferred embodiment illustrated is a reciprocating piston engine, but the inventive concept herein disclosed and claimed is considered to be readily applicable to rotary piston engines as well.

As seen in FIGS. 1 and 2, a piston 14 constructed in accordance with this invention is disposed in the cylinder 12 so that, as it reciprocates, it defines a variable volume working chamber 16 (alternatively referred to as the "combustion chamber") between the top of the piston and the closed end of the cylinder. The piston 14 includes a conventional skirt or guide 20, seal ring grooves 22 for seal rings 24, and wrist pin bearings 26 at the attachment points between the piston and a connecting rod 28 that joins the piston to an output crankshaft 30 of the engine 10. The piston fits within the bore 14 with a clearance $C_1$ (FIG. 2) and reciprocates between bottom and top dead center positions (BDC and TDC) during the cyclic operational events of the engine, all in accordance with well-known principles.

The specific piston constructed in accordance with the invention includes a working end portion that comprises a crown or cap 32 having a diametrical dimension or dimensions that is or are less than the diameter of the skirt 20, the cap 32 usually comprising simply a symmetrical body of reduced diameter d as compared with the major diameter D of the skirt portion 20 (see FIG. 1). If only the radii are considered, then the cap will be seen to have a reduced radius r as compared with the major radius R of the skirt 20 (FIG. 1). If the piston 14 is located in bore 12 as shown in FIG. 2, it can readily be seen that the width of the gap g is represented by the difference between $R+C_1$ and r. If the piston is viewed independently of the bore, as, for example, as shown in FIG. 1, the gap g can be defined as the transverse dimension between r and an imaginary cylindrical surface 34 overlying the area between the skirt 20 and the cap 32, the surface 34 having a diameter substantially equal to the bore B of the cylinder 12 (or the diameter D of the skirt 20 of the piston if the clearance $C_1$ is ignored). The imaginary surface 34 can thus be viewed as the locus of the cylinder bore 12 that receives piston 14, or, if the clearance is ignored, the locus of a curved surface that would constitute an upward extension of the skirt 20. In the following description and claims, the clearance $C_1$ between piston and bore is largely ignored in computing the various mathematical relationships and geometric configurations to avoid complicating the description of the invention. It will be readily understood by anyone familiar with calculations of this type that the dimension of the clearance $C_1$ can readily be taken into account wherever it is applicable.

Figure 5:
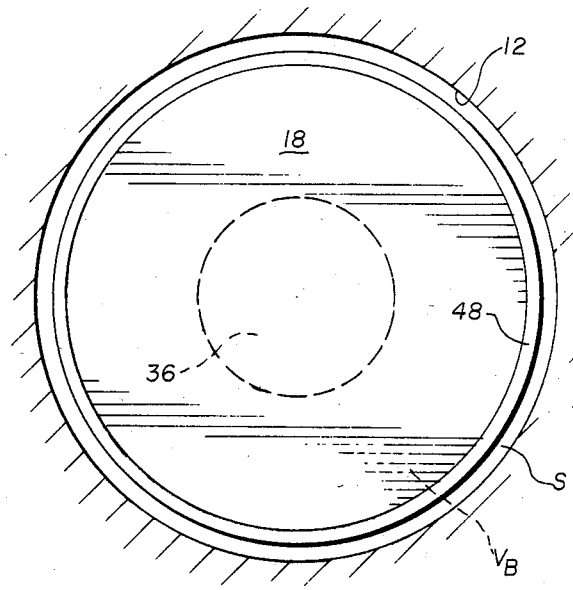
FIG. 5 is a plan view showing an embodiment of the piston gap constructed according to the invention wherein the gap between the air chamber in the piston and the engine working chamber is uniform around the top of the piston.
Figure 6:
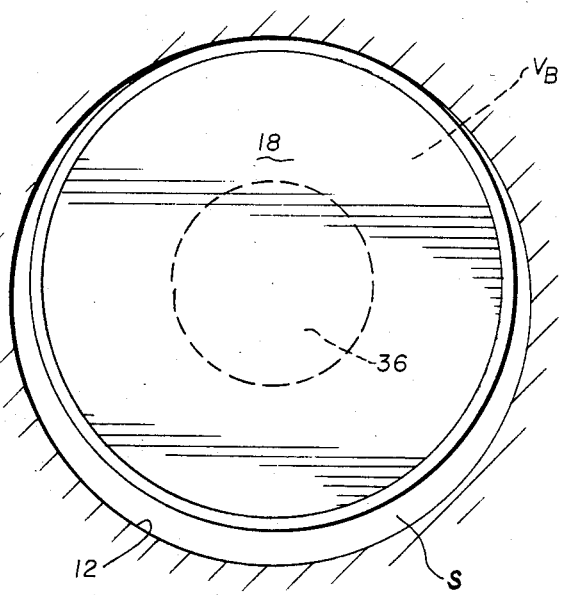
FIG. 6 is a plan view showing a different gap embodiment wherein the gap between the air chamber and the working chamber is not uniform, but results from the eccentric location of a round piston cap within the cylinder bore.
Figure 7:
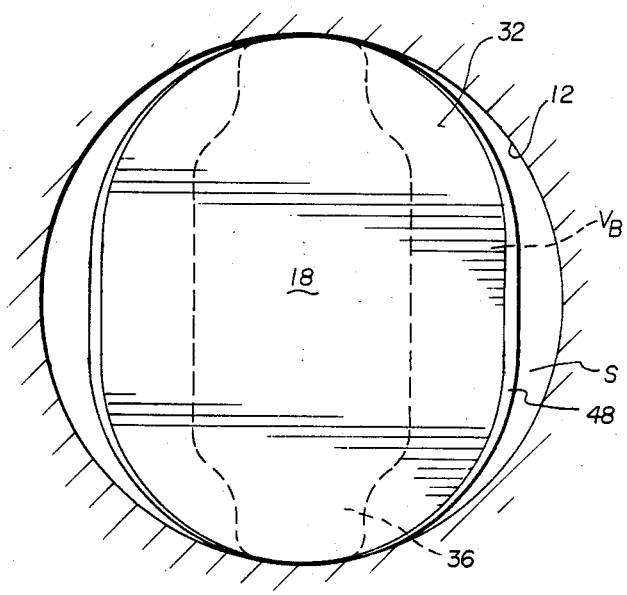
FIG. 7 shows still another plan view of a third embodiment of a gap configured according to the invention, wherein the gap is non-uniform and is divided around the circumferential length of the piston.

As shown in FIGS. 5, 6 and 7, the cap 32 can be configured in different forms, such as a concentric projection of the piston as shown in FIG. 5, with a uniform gap all around the cap; an eccentric yet symmetrical projection with a uniformly varying gap g around the gap, as shown in FIG. 6; or any other form that will satisfy the geometric requirements of this invention, such as, for example, the shape shown in FIG. 7 where the cap is configured to divide the gap into two areas, the gap having a varying width along its peripheral length around the circumference of the piston or the bore. Various forms of gaps and caps will result from applying the principles of the invention to various engine configurations and from the need to meet certain operational cycle requirements. However, as will become evident from an understanding of the inventive concepts described below, all of the pistons (including the caps) and combustion chambers embodying the invention will be related by certain mathematical relationships involving variable parameters and dimensions associated with any engine utilizing the invention.

The piston 14 as is characteristic of previous NAHBE-type pistons, includes a reduced peripheral portion 36 beneath the cap 32 and above the main piston skirt or guide 20 above the seal ring grooves 22. The reduced portion 36 provides an air chamber 38 under the cap 32 and above the upper seal ring 24 that communicates with the working chamber 16 solely through the gap g. The air chamber 38 is thus fully defined by the reduced diameter area 36 of the piston at its radially innermost limit, by the bore 12 or imaginary surface 34 at its radially outer limit, by axially spaced, upper and lower radially converging surfaces 40, 42, by the gap length L and by the length of the crevice ($L_R$) above the top seal ring. In the preferred embodiment, the surface 40 closely adjacent the working end portion of the piston intersects the periphery of the cap 32 portion of the piston along a sharp edge 44 (FIG. 2) for reasons that will be explained below in connection with the desired dynamics of the outward flow of gas from the chamber 38 into the working chamber 16.

The peripheral area of the cap 32 includes an axial surface 46 having an axial length L which defines a gap "length," and which intersects the working face of the piston along a beveled or axially and radially sloped surface 48 in the preferred embodiment. The axial length L of the gap g is considered to be an important dimension in accordance with the invention, along with the gap width g, the volume $V_B$ of the air chamber 38 and the geometry of the sloped surfaces 40 and 42. The volume $V_B$ is normally calculated so that it includes the volume $V_g$ of the gap g, which is the gap areas (the gap width multiplied by the gap circumferential length around the piston—(see FIGS. 5, 6 and 7) times the gap length L, with the length L being measured along the periphery of the axial surface 46 of the cap. The determinations of such lengths and volumes is made in accordance with routine mathematical principles and does not need elaboration. Also, as shown in FIG. 1, the volume $V_B$ of the chamber 38 will be calculated to include the crevice volume $V_c$ between the piston 14 and the bore 12 (or the imaginary surface 34) along the length $L_R$ of the crevice surface 50 up to the proximate edge of the top seal ring groove 22, but $V_c$ is largely ignored dimensionally for purposes of this explanation and description of the invention except in those specific instances where its significance is particularly important.

Figure 8:
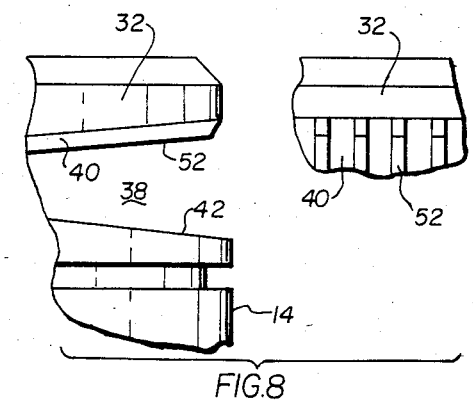
FIG. 8 is a detailed view showing a section of the piston of FIG. 1 with an alternate configuration of the upper surface of the piston air chamber.

While the configuration of the surfaces 40 and 42 within the chamber 38 as shown as being smooth in FIG. 2, an alternate embodiment is shown in FIG. 8 where radially and axially projecting fins 52 are shown at least on the upper surface 40. These fins assist in the heat exchange between the lower surface of the cap and the air that is circulating in the air chamber 38 during the operation of the engine, as will be explained in more detail below.

Figure 9:
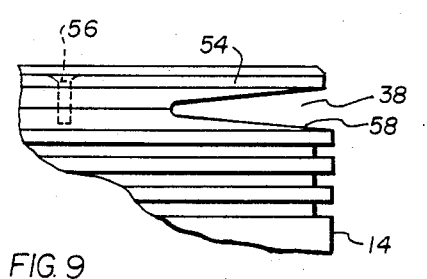
FIG. 9 is an elevational detail view of a section of the piston of FIG. 1 showing an alternate piston cap construction.

Still another embodiment of the construction of piston 14 is illustrated in FIG. 9 where the cap 32 is a separate component 54 assembled to the main piston body by a suitable fastener 56 or by another suitable connector arrangement, including brazing and welding. The surfaces 40 and 42 also can be coated with a suitable catalytic material 58 to promote formation of radicals in chamber 38 or to otherwise assist in the control of the chemical reaction activity that occurs in chamber 38.

In accordance with conventional practice, the determination of the compression ratio of the engine 10 using a piston similar to piston 14 is simply made by comparing the ratio of the total volumes of the working and air chambers 16 and 38, respectively, when the piston is at BDC with the volume of the working and air chambers when the piston is at TDC. The latter is conventionally referred to as the "clearance" volume of the working chamber. For convenience, the volume of the air chamber is often referred to simply as "$V_B$" and the ratio of $V_B$ to $V_a$ is conveniently referred to as "the balancing ratio" stemming from early theoretical "Heat Balanced Cycle" terminology wherein the heat was considered as being added to the theoretical air cycle in a "balanced" manner. Various published literature, including those mentioned above, can be readily referred to if additional information is desired about the theoretical Heat Balanced Cycle that constitutes the background of this invention.

Figure 4:
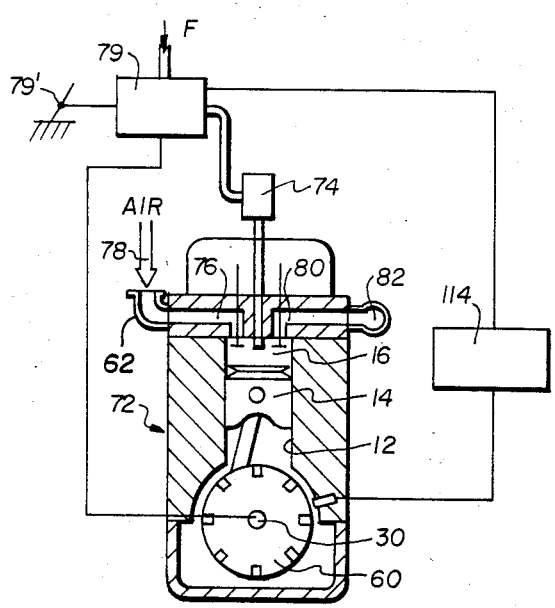
FIG. 4 is a schematic representation of an I.C. engine similar to FIG. 3, using direct fuel injection for supplying the charge to the working chamber of the engine.

Typical representative engine systems using the present invention are shown in FIGS. 3 and 4, with a typical fuel-aspirated engine schematically depicted in FIG. 3 and a typical fuel injected engine in FIG. 4. Each engine includes a piston 14 configured as shown in FIGS. 1 and 2, and suitable functional hardware connecting the piston to an output shaft 30 to which a flywheel 60 is attached. In FIG. 3, the aspirated engine includes a charge intake manifold 62 through which a combustible air and fuel charge mixture is supplied to the intake port 64 of the engine, under the primary control of a throttle 66.

In the preferred embodiment of the invention, fuel is added to a primary air stream 68 supplied to the intake manifold and a secondary air stream 70 is also provided with its own, separate control system that will be described below in connection with the description of FIG. 13. While the schematic illustration in FIG. 3 shows the primary and secondary air streams both connected to a common manifold, separate manifolds could be utilized as well as other devices for separately supplying and controlling a primary and secondary air stream supplied to the working chamber of the engine. In all instances, the primary and secondary air streams (as well as the fuel, if desired) are suitably tuned or otherwise controlled so that, during each intake event of charge into the working chamber, air alone or air with a very minor proportion of fuel (insufficient for sustained combustion) is first drawn into the working chamber, followed at a later time by a fuel rich mixture from the primary side of the charge supply. Thus, when compression begins, substantially only air is near the piston and all of the fuel in the total charge (the total charge comprising all of the air and all of the fuel in the working chamber when the intake port is closed) is contained in the working chamber at the end thereof opposite the piston. When compression of the charge proceeds, air with very little fuel is transferred to the air chamber 38 under the piston cap 32 via the gap g where it is compressed and heated along with the rest of the charge in the working chamber. Due to the geometry of the air chamber 38, particularly the upper and lower sloping walls 40, 42, the air transferred into air chamber 38 is rapidly swirled under the cap 32 in an annular vortical pattern so that it is circulated in intimate heat exchange contact with the surfaces 40, 42. This heat exchange contact between the transfered air and the piston cap (particularly the surface 40) is extremely important, since it is believed to constitute the basis for improvement to the efficiency of the operating cycle of this invention as compared with Otto and diesel cycles using conventional piston configurations. In essence, the heat exchange between the cap that has been heated by the previous combustion/expansion event and the air transferred under the cap during the subsequent compression event produces a regenerative effect that results in less total heat rejection during each cycle for a given quantity of fuel as compared with a conventional Otto or diesel cycle. Thus, if desired, fins and catalytic surfaces such as are illustrated in FIGS. 8 and 9 may be used to optimize the swirling, heat exchange contact between the air transferred into chamber 38 and the cap 32 at the working end of the piston.

Since a minor quantity of fuel will usually be transferred to the chamber 38 along with the air, certain hydrocarbon radical production activity will occur in chamber 38 as well as in the working chamber 16, the production and reaction of hydrocarbon fuel radicals under higher pressure and temperature conditions being a well-known and documented phenomena, see for example U.S. Pat. No. 4,317,432. The production and management of the radicals generated in chamber 38 and the manner in which they are used to contribute to the primary reaction in the working chamber 16 will be discussed below in connection with the explanation of FIGS. 12 a-p.

In FIG. 4, the engine 72 uses a similar piston 14, but the fuel is injected by using injectors 74 as contrasted with the fuel aspiration system illustrated in FIG. 3. The injector 74 as shown supplying high pressure fuel directly into the working chamber of the engine, although, in the alternative, any fuel injector arrangement could be utilized that would insure axial stratification of the working chamber at the initiation of the compression event. Indirect injection of fuel at the intake port area will also produce the needed stratification control, but the invention is not intended to be limited in any manner based on a specific injector system. The fuel F in FIG. 4 is supplied via an injection controller 79 responsive to the position of a throttle 79'. In both engine embodiments of FIGS. 3 and 4, the exhaust port 80 communicates with exhaust manifold 82 to carry away combustion products from the chamber 16. In FIG. 3, a spark igniter 84 is available for initiating combustion reaction in the chamber 16 in accordance with conventional practice, with the igniter 84 being supplied with high energy electrical potential via distributor 86 so that a spark is made available in the working chamber 16 in timed relationship with the motion of piston 14. In the embodiment of FIG. 4, ignition can be compression induced or by spark.

In accordance with the present invention, it is desired to use the shock wave energy associated with ignition of the charge in the combustion chamber to drive the air chamber as a Helmholtz resonator. Helmholtz resonators generally are well-known and have been extensively described in the literature. A classic discussion of Helmholtz resonators in the environment of the combustion chamber of an internal combustion engine can be found in U.S. Pat. No. 2,573,536 granted to A. G. Bodine, Jr. on Oct. 30, 1951, this patent being concerned with a process of attentuating or cancelling detonation waves associated with the combustion process.

Figure 10:
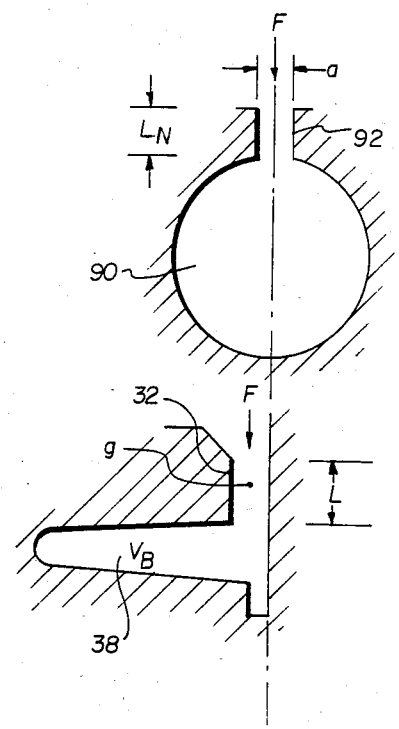
FIG. 10 is a diagramatic representation to show equivalency between a classical theoretical Helmholtz resonating chamber and the piston air chamber constructed in accordance with this invention.

In FIG. 10, the upper part of the view shows a classic Helmholtz resonator comprising a chamber 90 containing a gas at a particular temperature, the chamber having a restricted opening or neck 92 having a length $L_n$ and a geometric orifice shape at the opposite ends of the opening 92. When the air in the neck 92 is subjected to an exciting frequency F that corresponds with the natural resonant frequency of the gas in chamber 90, a resonant condition occurs in the chamber 90 wherein the gas therein will be excited at its Helmholtz resonant frequency and will remain excited with relatively low input energy. The diameter, cross sectional area and length $L_N$ of the neck 92, and the volume of chamber 90 are variables that determine the resonance condition of the chamber, but the theory of the Helmholtz resonator is quite general as regards the actual shape of the chamber volume 90 itself. Thus, the present invention is based on the assumption that the air chamber 38 in the piston configuration shown in FIGS. 1 or 2, when the piston is placed in a bore 12, can react precisely like a Helmholtz resonator chamber 90 in response to cyclic pressure wave energy applied to it from the working chamber through the gap g. When the elements constituting the Helmholtz resonating chamber are properly configured, input pressure wave energy corresponding in frequency to the Helmholtz resonating frequency of the gas in chamber 38 at the temperature in chamber 38 will induce a resonant condition in the latter in the same manner as the system depicted at the top of FIG. 10. The analogy between the classic Helmholtz resonating chamber configuration and the Helmholtz resonator provided by the configuration of the piston 14 is illustrated in FIG. 10 at the upper and lower portions of the view, respectively. In calculating the resonant frequency of the Helmholtz resonating chamber 90 (or 38) the neck length $L_N$ is significant and must be adjusted by a suitable non-dimensional constant, depending upon the geometry at the inlet and outlet ends of the neck 92. A flanged inlet, for example, yields a certain effective length of the neck, while a sloped inlet such as shown in the lower view in FIG. 10 yields a different effective neck length. In practice, for a beveled inlet as shown in lower chamber arrangement in FIG. 10, a Helmholtz correction factor between 0.6 and 0.85 is applied to adjust the actual neck length to produce an effective neck length that is representative of what is "seen" by the resonating system.

An important aspect of this invention is the discovery of certain relationships that must exist between the frequency of the periodic shock and expansion waves associated with ignition and combustion of the charge, which travel near the speed of sound in the combustion chamber at the temperature of combustion; the geometric dimensions of the cylinder; the volume of the air chamber; the gap width; length and cross sectional area; and the temperature of combustion; if optimized efficiency and performance of the piston and combustion chamber are to be achieved. Moreover, in applying the invention to different engine configurations, it is important to understand these relationships and to design the shapes and volumes of the piston, combustion chamber, gap and air chamber accordingly. As stated previously, while operative NAHBE engines utilizing air chambers responsive to combustion wave interaction have been demonstrated, optimization of real engines to approach the theoretical limits of efficiency indicated by "heat balanced" or "regenerative" theories was not readily achievable in a practical form. This invention is thus based on the more recent discovery that it is possible to mathematically define a piston configuration for any engine using a given fuel and having a given cylinder bore, compression ratio and displacement so that the Helmholtz resonant condition is assured, and that best engine performance will be achieved.

Specifically, assuming that the ignition of each charge in the working chamber 16 produces periodic vibrational shock waves of frequency $F_A$ which travel near the speed of sound in the working chamber, the air chamber is configured to be driven in Helmholtz resonance at its natural frequency $F_B$ by the $F_A$ frequency in the manner of a Helmholtz resonator during the combustion/expansion part of the cycle while the geometric proportions of the cylinder bore, air chamber 38, gap g, axial gap length and gap cross sectional areas are established in accordance with the following formula:

$$V_B = \frac{SC^2}{(L + kg)(2\pi F_B)^2} \text{ cm}^3$$

where (using metric units for all dimensions):
$V_B$ is the volume of the air chamber 38;
S is the cross sectional area of the gap g;
C is the speed of sound in the air chamber 38 at approximately the autoignition temperature of the compressed charge in the working chamber 16;
L is the gap length;
k is the appropriate Helmholtz non-dimensional correction factor between 0.6 and 0.85 to adjust the effective length of the gap on the basis of the configuration of the end areas of the gap;

$F_B$ equals $K/B$ Hz, where K is a numerical value between 43,000 and 51,000, and B is the diameter of the bore (or the diameter of the piston if the clearance is ignored); and $g = 0.01072B + 0.1143$ within the tolerance range of $+0.050$ cm. and $-0.025$ cm.

If the gap g is a variable around the periphery of the piston, it is assumed to be a uniform gap having the above dimension g to produce a cross sectional area S. The actual gap area must then satisfy this area value, regardless of the gap profile. The maximum width of the gap, when it is not symmetrical, will not exceed that dimension that will result in the attainment of choked flow (critical pressure ratio) between the air chamber and working chamber during at least some part of the engine operating cycle, and the total gap area and volume must satisfy the Helmholtz resonator requirements when subjected to the exciting frequency $F_A$ in the working chamber.

The gap length L, moreover, is initially selected so that any flame propagation between the working and air chambers is always quenched (assuming that there may be pockets or areas of combustible fuel mixture in the air chamber, or that fuel may be driven into the air chamber ahead of the flame front moving across the combustion chamber). The calculation of L per se is conventional and follows accepted flame propagation quenching theory, with L usually related to the absolute temperature of combustion in the working chamber and the pressure in the working chamber according to the formula:

$$L \propto \frac{(K)(T_A)^{\frac{1}{2}}}{P_A}$$

where:
K is a constant;
$T_A$ is the temperature of burning fuel in the working chamber; and
$P_A$ is the pressure in the working chamber.

It is also assumed in the formula given above for $V_B$ that the maximum linear dimensions of the gap and the air chamber in any direction is less than $\frac{1}{4}$ wave length of the resonant frequency $F_B$ in the air chamber 38 at the temperature of the chamber during combustion/expansion part of the operating cycle of the engine.

Since it is desired to obtain a reasonably broad frequency response between $F_A$ and the resonant condition in the air chamber, such response called "Q", the following formula is also used to "tune" the dimensions that satisfy the equation for $V_B$ given above:

$$Q = 2\pi \sqrt{\frac{(L + kg)^3 V_B}{S^3}} \leq \text{Approx. } 1.0$$

When the dimensions of L, g and S satisfy both the formulas for $V_B$ and Q, the proper dimensional relationship in accordance with this invention will have been established, and a proper balancing ratio, gap geometry and air chamber volume will have been provided for the given fuel, compression ratio, bore size and stroke of the engine.

Another aspect of the present invention is the discovery that, with the proper "tuning" of the variables mentioned above, "organ pipe" excitation of the working chamber above the piston working face can be induced to cause turbulent mixing in the combustion zone of the working chamber during the latter stage of the expansion part of the operating cycle. The principle of organ pipe resonance in a closed tube is well-known and the fundamental resonant frequency is only dependent upon tube length and the speed of sound at the temperature of the gas in the tube. The present invention induces organ pipe fundamental or harmonic resonance in the cylinder bore above the piston as the piston approaches BDC by using the resonating gas in the air chamber at approximately frequency $F_B$ to drive the working chamber (now at some different natural frequency than $F_A$ since it is cooler than the original combustion temperature) in organ pipe resonance at least for a brief span of time, although theoretically it should be possible to drive the working chamber at organ pipe resonance at multiple points during the expansion stroke. In FIG. 11, the principle of organ pipe resonance is illustrated, with piston 14 approaching BDC, the air chamber 38 resonating at or near its $F_B$ frequency, and the latter exciting the working chamber 16 at temperature $T_A$ and having length $L_W$ at its fundamental organ pipe frequency, schematically shown by the wave lines 94. All linear dimensions of the gap orifice and air chamber are less than $\frac{1}{4}$ wavelength of $F_B$.

It is important to emphasize the significance of the heat exchange relationship between the cap 32 and the air in the chamber 38 during the latter stage of the compression event of each cycle. Storage of heat from a previous cycle in the cap significantly contributes to the overall efficiency of the cycle and the temperature of the cap is therefore important. The cap temperature can be controlled by selecting suitable materials for the cap and connecting the latter to the main piston body in such a manner that a desired cap temperature is established and maintained during engine operation. To ensure that $F_B$ will match $F_A$, the temperature in the air chamber 38 must be controlled at the prevailing pressure upon ignition of the fuel to obtain the required Helmholtz resonance that is critical to the satisfactory operation of the system according to this invention.

Moreover, in a spark ignited engine, it is important that the temperature in the air chamber 38 is maintained below the detonation or "knock" temperature of the fuel in the working chamber 16 at the prevailing pressures so that engine knock is avoided at all engine operating conditions. Also, as will be explained in more detail below in connection with FIGS. 12a-p, the temperature in chamber 38 also must be controlled so that the production of radicals in chamber 38 and protection of radicals transferred into (or already in) the chamber 38 are assured by maintaining the temperature in the chamber below that at which the radicals therein would react into less desirable compounds from the standpoint of combustion enhancement.

The present invention, in addition to providing a suitable piston and combustion chamber geometry for a given engine in accordance with the formulas mentioned above, also contemplates an adaptive engine tuning system for controlling the air-to-fuel ratio of the charge supplied to the working chamber of the engine using the inventive piston and chamber. If spark ignition is used to initiate combustion, the spark advance setting may also be controlled in addition to the air-to-fuel ratio.

As a starting point, the engine 10 or 72 (FIG. 3 or 4) is completely "mapped" (i.e., the relationships of engine operating variables are established and plotted) on a suitable test stand (not illustrated) to establish for the particular engine the relationship between air-to-fuel ratio; spark timing; indicated horsepower; indicated specific fuel consumption; engine speed; load; fuel flow rate; and emissions (unburned hydrocarbon and carbon monoxide, in particulary).

Figure 13:
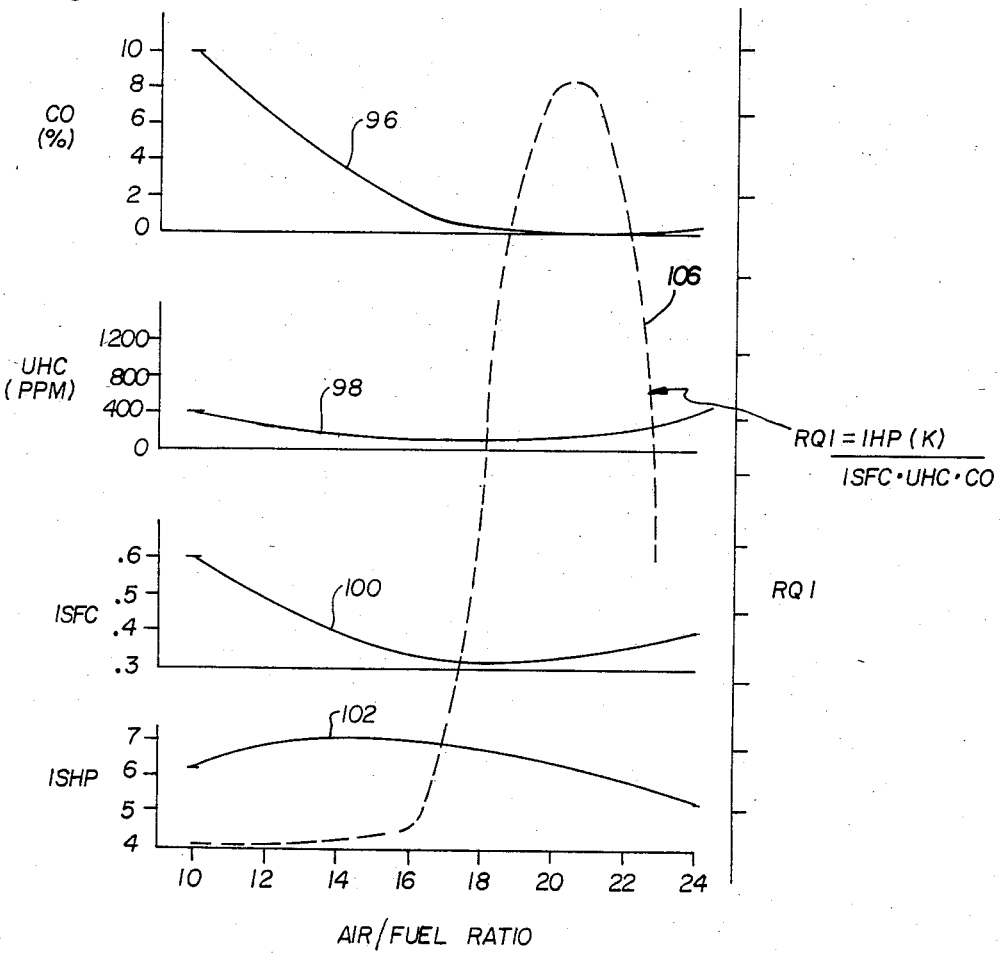
FIG. 13 is a set of graphs relating air to fuel ratio of the charge supplied to the working chamber of an engine constructed in accordance with this invention to indicate its specific horsepower, indicated specific fuel consumption, unburned exhaust hydrocarbons and exhaust carbon monoxide (volume percentage), as well as the "Run Quality Index" (RQI) correlation for the engine.

As shown in FIG. 13, a set of curves is generated from the engine mapping procedure to show how carbon monoxide (CO), unburned hydrocarbon (UHC), indicated specific fuel consumption (ISFC) and indicated horsepower (IHP) relate to air/fuel ratio for the engine over its operating range. It should be noted that experimental tests in the laboratory indicate that an air-to-fuel ratio of approximately 16:1 at best power and approximately 20:1 at best economy will consistently be indicated for all engines when the piston and combustion chamber geometries established by the formulas previously mentioned are utilized. Thus, an initial fuel and air distribution system can be established for any engine using the piston and combustion chamber of this invention that will provide an overall air-to-fuel ratio in the charge between the limits of 16:1 at best power and 20:1 at best economy. There still remains, however, the problem of controlling the air-to-fuel ratio under other conditions of engine operation to attain maximum attainable efficiency of the engine.

To achieve the maximum attainable efficiency, the present invention contemplates using a recently developed curve that relates CO, UHC, ISFC and IHP to air/fuel ratio at various operational speeds of the engine. This curve, called RQI for "Run Quality Index" is mathematically computed according to the following formula:

$$RQI = \frac{(IHP)K}{(ISFC)(UHC)(CO)}$$

and is illustrated as curve 106 in FIG. 13, with the ordinate scale to the right of the drawing. The RQI curve thus relates, in effect, what is supplied to the combustion chamber with what is thrown away in the exhaust stream to provide a sharply peaked curve 106 that indicates a best air-to-fuel ratio for best practical running of the engine. It will be seen that, at maximum RQI, the engine is operating at its maximum practical efficiency at any speed and load, which, of course, is not necessarily the same as the maximum theoretical efficiency of the engine under the same conditions. The maximum RQI curve is intended to establish a target for establishing a charge air-to-fuel ratio, and suitable spark timing during actual engine operation. It still remains necessary to provide a suitable control means to enable such control over the air-to-fuel ratio and spark timing (assuming spark ignition) so that the composition of the charge can be adjusted in a direction that will ensure maximum engine RQI operation during all engine operating conditions.

It is assumed that during the engine mapping procedure previously referred to, the best air-to-fuel ratio and ignition timing that produces best RQI at each engine test RPM will have been determined. Moreover, in accordance with this invention, the air-to-fuel ratio in the primary charge stream supplied to the intake manifold 62 of, for example, the fuel aspirated engine 10 shown in FIG. 3, will be adjusted so that it provides an air-to-fuel ratio of approximately twice the best economy air/fuel ratio at best power operation of the engine, with the secondary air being adjusted to make up the balance of the total air fuel ratio. The secondary air (shown at 70 in FIG. 3) is provided with a control mechanism that continuously adjusts the quantity of secondary air supplied to the engine intake to provide an air/fuel ratio that will provide best RQI engine operation under various load and speed conditions.

In accordance with this invention, the secondary air is controlled by using a "lean limit control" system such as is disclosed in U.S. Pat. No. 4,368,707 granted to Irvin and Michael Leshner, only calibrating the system so that it seeks a "lean limit" that corresponds with best RQI for the engine. The patented system, of course, essentially seeks the lowest possible misfire lean limit of an engine without regard to RQI operation. However, the system can be calibrated so that it will seek the optimum air/fuel ratio consistent with best RQI engine operation by an appropriate adjustment of the calibration of the system so that a "misfire" situation is seen by the system on either side of the maximum RQI, which is responded to by adjusting the air/fuel ratio towards maximum RQI.

Thus, with reference to FIG. 3, the secondary air stream 70 can be controlled by a throttle plate or valve 110 which in turn is controlled by a servomotor 112 which is regulated by the central control unit of the lean limit control system 114 similar to that described in the aforesaid U.S. Pat. No. 4,368,707. The lean limit control system, as described in the patent, senses instantaneous engine power output by sensing instantaneous angular velocity of the flywheel 60 magnetically by means of a pickup 116 that senses the instantaneous velocity of the passing flywheel teeth adjacent the sensor. The velocity signal is processed to produce an instantaneous acceleration (or deceleration) signal in the central control unit 114 after receiving the sensor signal 16 via line 118. The central control system 114 "interprets" the instantaneous acceleration or deceleration signals as instantaneous power readings of the engine and instructs the servomotor 112 to "go lean" or "go rich", whereupon the valve 110 is opened or closed to achieve the leaner or richer condition. The specific air-to-fuel ratio that is sought by the control system 14 corresponds with that air-to-fuel ratio that produces best RQI as shown by curve 106 in FIG. 13. At this point, the engine is operating at its maximum "attainable" efficiency, in the sense that it is operating under conditions that strike the best balance between the fuel supplied and the power demand imposed on the engine. Of course, if a misfire is sensed by the sensor 116, this would indicate to the central control system 114 that the air-to-fuel ratio is inappropriate and that further adjustment must be made to produce the power demanded of the engine. However, when the sensor 116 observes that the misfire limit has been reached, and when the central control system 114 determines that the secondary air controller 112 has been set to produce an air fuel ratio consistent with best RQI, it can be readily appreciated that the engine is operating at its best achievable efficiency.

A spark timing controller 120 to control the distributor advance/retard setting is provided, preferably, under the command of the central control system 114 so that for each RPM of the engine as observed by the fly wheel sensor 116, the optimum spark setting for best RQI will be established in accordance with the appropriate setting determined by the previous engine mapping tests. Thus, the central controller 114 would include, in addition to the "Lean Limit Control" system just discussed, a sensor for receiving or deriving an engine RPM signal from the fly wheel sensor 116 and generating a signal in response to the speed signal that controls the spark advance mechanism 120 in the distributor via line 122.

In an engine wherein combustion is initiated by auto-ignition, for example such as an engine 72 of FIG. 4, at using a compression ratio of between 5-9 to one, the lean limit controller 114 would be arranged to control the fuel injector control system 79 to regulate the air-to-fuel ratio for maintaining best RQI engine operation. The timing and quantity of fuel supplied to each cylinder of a fuel injected engine is carefully controlled by the control system 114 to provide exactly the air/fuel ratio needed for best RQI engine operation. In addition, of course, the control system 114 would ensure that the fuel is not supplied to the working chamber 16 in a manner that adversely affects the transfer of air without fuel into the air chamber 38 during the compression event.

In the preferred embodiment of this invention, the gap g will be configured so that, at least over part of the upper operating speed range of the engine, the classic critical pressure ratio that produces choked flow through an orifice will exist between the air chamber volume $V_B$ and the working chamber volume $V_A$ during at least part of the compression event. Assuming that the pressures between the working and air chambers 16, 32 are not equalized by the time ignition of the charge is initiated, the invention results in an engine having a dynamically variable compression ratio that is dependent solely upon engine speed. As engine speed increases, so does the effective compression ratio to produce increased power. At lower speeds, when the choked flow condition is not induced, the engine operates at the lower actual volumetric compression ratio in accordance with the ratio of the working chamber volume when the piston is at BDC versus the working chamber volume when the piston is at TDC. Preferably, the gap g will be selected so that the choked flow condition exists over the upper 35% of the speed range of the engine, although this could be varied to suit specific requirements. If the gap g is not constant, it will be understood that the maximum width of the gap will not exceed that required to establish a choked flow condition between the air and working chambers above the threshold speed at which the effective compression ratio begins to increase due to the inability of the pressure in the working chamber 16 to bleed down into the air chamber 32 through the gap g.

Moreover, it will be recognized that a choked flow condition between the air chamber and the working chamber can be established at the moment of opening of the exhaust valve when the pressure in the working chamber suddenly drops. By properly selecting a gap width that will create a critical pressure ratio across the gap when the exhaust valve opens, the expansion of high pressure gas in the air chamber into the working chamber will be momentarily delayed to preserve and control the discharge of highly compressed and heated air with radicals from the air chamber into the exhaust discharge. The degree of preservation of heated air and radicals, of course, will depend upon the extent of the choked condition and other factors. For example, by providing a sharp edge 44 at the edge of the gap nearest the air chamber 33, choked flow can be virtually assured for usual gap widths.

With reference to FIGS. 12a-p, the operation of the invention is illustrated schematically, including the use of the Helmholtz resonant condition to cause periodic pumping of air from the air chamber 38 into the working chamber 16; the choked flow condition between the air and working chamber; organ pipe resonance; the coupled oscillator; and radical generation/management to improve and control the combustion process in the engine.

Starting at FIG. 12a, the piston 38 is at BDC, both valves (intake and exhaust) are closed, and an axially stratified charge is pictorially represented in the working chamber 16, with air and very little fuel adjacent the piston and a fuel-rich mixture near the closed end of the working chamber. In all instances, at the beginning of the compression event, air with no or very little fuel must be present adjacent the working end of the piston to insure that air is transferred into the air chamber 38 during at least the initial part of the compression event. Such axial stratification can be achieved by utilizing various charge control devices including, but not limited to, dual air supply intake manifolds with associated air controls, charge intake valve arrangements, fuel injection controls, intake manifold port arrangements, and so forth.

The compression event begins and progresses as seen in FIGS. 12b and 12c, resulting in the transfer of air from the working chamber into the air chamber, as shown by arrows 123 in FIG. 12b. As compression progresses, a roll vortex 124 forms under the cap 32 within the air chamber due to the geometry of the gap g and the air chamber walls, and the fluid dynamics within the chamber. This roll vortex is important since it produces intimate heat exchange contact between the air entering the air chamber and the underside of the cap 32 which, after several cycles, will become heated to a desired temperature range to ensure that the Helmholtz resonating frequency $F_B$ in the air chamber will match the natural frequency $F_A$ in the working chamber, as previously described. If the engine is configured to have a dynamically variable compression ratio as described previously, the onset of choked flow between the working and air chambers 16, 32 will begin at some point during the compression event as the piston reaches its maximum velocity.

As the piston further approaches TDC, the air in the air chamber 16 has been heated to a condition whereat its temperature is compatible with the desired Helmholtz resonating frequency $F_B$ and ignition of the charge occurs (FIG. 12d). Radical formation in the air chamber 38 has already progressed before ignition of the charge to a point that will be determined by the pressure and temperature conditions in the air chamber and the nature of the fuel being burned by the engine. However, it can readily be appreciated that, since there is very little fuel in the air chamber, the radical content that is generated from minor quantity of fuel contained in the air will be small as compared with the radical population in the air chamber that has been produced in the working chamber during the previous cycle, as will be explained momentarily.

In FIG. 12d, ignition has been initiated, the shock wave preceding the flame front has not yet reached the gap between the working and air chamber, and then, as seen in in FIG. 12e, the shock wave from ignition has reached and penetrated the gap and has driven the heated gas in the air chamber into Helmholtz resonance at the Helmholtz resonating frequency of the air chamber. Compression and expansion wave interaction between the working and air chambers now produces a periodic vibrational transfer of air from the air chamber into the working chamber to participate in the fuel combustion reaction process. Not all of the air from the chamber is transferred at once, of course, since this would be detrimental to the combustion process. Rather, the air is controllably released through the critical gap to react with the fuel in a time dependent manner at a rate that is compatible with the combustion process itself. It is to be noted that the transfer of air from the air chamber into the working chamber progresses as a pumping action even while the pressure in the working chamber is increasing and the total average pressure in the working chamber is above that of the air chamber. It is the nature of the wave interaction process that the rebounding of the shock waves from the gap area produces a momentary local reduction in pressure in the gap vicinity that enables the expansion of the Helmholtz excited air from the air chamber into the combustion zone. The transfer of air therefore continues entirely throughout the combustion process, and is not simply dependent upon the ability of the air in the air chamber to bleed down by expansion into the working chamber after the piston has moved sufficient distance away from the closed end of the cylinder to cause a suitable reduction in pressure in the working chamber.

As shown in FIG. 12f, transfer of air from the air chamber into the working chamber proceeds as the latter expands due to motion of the piston, with the air chamber still oscillating at its Helmholtz resonant frequency $F_B$. It has been observed that the highly heated air from the chamber 38 enters the combustion zone along the outer cylinder walls and reacts with fuel as it expands towards the center in the upper area of the cylinder working chamber.

Thus, from the moment of ignition onward air is continuously supplied into the combustion zone due to the Helmholtz resonance in the air chamber and shock-/expansion wave interaction in the vicinity of the gap. The combustion process is thereby improved so that all of the fuel in the charge is reacted, since the apparatus of the invention permits a prolonged combustion time that insures reaction of all of the fuel elements. As is well known, oxidation of the fuel (combustion) is a chemical process involving the fracturing of bonds between the hydrocarbon elements that produces various intermediate compounds having different bond strengths. By providing additional time for combustion with the addition of highly energized oxygen into the combustion zone, the unstable compounds requiring additional time for reaction can be reacted with available oxygen. The flame front in the working chamber never actually penetrates the gap into the air chamber, of course, since the gap has been configured to cause quenching of any flame front reaching this area.

If the engine operates in the autoignition mode, the timing of ignition will be determined by the pressure and temperature in the working chamber, as is well known. However, in accordance with the present invention, the autoignition process appears to occur at multiple points within the working chamber due to the presence of radicals that have been previously seeded in the incoming charge and the additional radicals that are supplied from the air chamber by the Helmholtz resonating action. A smoother autoignition at lower compression ratio is produced and the timing of ignition can be controlled by constructing the cap 32 of a material having a temperature coefficient that optimizes the cap temperature for the fuel being burned and the compression ratio of the engine. This will be discussed in more detail below when a process for controlling the timing of autoignition is explained.

In FIG. 12g, the piston is approaching the BDC position and organ pipe resonance has been generated in the working chamber as explained previously. The reaction of the remaining fuel adjacent the cap continues and further heating of the cap occurs by radiant energy.

In FIG. 12h, the exhaust valve has opened and the products of combustion immediately begin their exit from the combustion chamber, accompanied by a drop in pressure in the working chamber. The remaining oxygen and radical population in the air chamber begin expanding across the gap (in delayed fashion if the gap is configured to cause critical choked flow between the air chamber and the working chamber at this point) to join the exhaust products, reacting with any remaining fuel or reactable hydrocarbon compounds in the working chamber to provide a thermal reactor effect that cleans up the exhaust products.

During the exhaust event, outgassing of the ring and clearance crevices of unburned hydrocarbons and vaporized oil occurs, and it is well known that the presence of these compounds contributes significantly to the unburned hydrocarbon population of exhaust gases in standard conventional engines. In the present invention, outgassing of hydrocarbons from the crevice and ring areas only extends into the air chamber 38, which is closely adjacent the crevices. (As seen in FIG. 2, the length of the crevice surface 50 between the bottom of the chamber 38 and the top of the first ring seal is kept as short as possible to minimize the volume of the crevice area above the ring seal grooves.) The outgassing of unburned hydrocarbons and vaporized oil into the air chamber 38, on the other hand, produces hydrocarbon radicals that can contribute to the further reaction of the fuel in the working chamber 16 with the available oxygen from the air chamber. Some of the radicals formed by the outgassing of the crevice area remain in the air chamber for use at a later time. Thus, the heated air chamber 38 beneath the cap 32 serves as a reactor zone for the fuel molecules outgassed from the piston clearance and ring crevices, thereby reducing or eliminating UHC content from this source in the exhaust stream. In passing, it should be noted that most crevice areas are dimensionally too small to permit the generation of radicals therein, so that the availability of the larger, closely adjacent heated air chamber volume $V_B$ provides a significant benefit in reducing exhaust UHC that would otherwise be generated by the outgassing process.

As the exhaust event progresses, the reactions occurring in the air chamber cause further expansion and agitation of gases in the air chamber which results in acceleration of the column of gases above the gap area in the cylinder 12 towards the closed end of the cylinder and a subsequent rebound of the column towards the piston 14 to produce high turbulence and mixing in the working chamber as the exhaust event progresses (see FIGS. 12i and 12j). During the middle part of the exhaust stroke, as shown in FIG. 12k, acceleration of the piston causes momentary inflow of combustion products into the air chamber as the flow across the gap area reverses. However, in FIG. 12l, deceleration of the piston and lower pressures in the working chamber as the end of the exhaust stroke is approached cause final depressurization of the air chamber and completion of the outgassing of the crevice areas of the piston.

The final reaction of crevice vapors in the air chamber at this time produces various hydrocarbon radicals that can be characterized as "pre-flame" radicals in contrast to radicals present in the exhaust stream resulting from the combustion process, the latter being conveniently characterized as "post-flame" radicals. The pre-flame radicals, of course, will be somewhat different in chemical composition from the post-flame radicals for obvious reasons, since they will not have participated in the high temperature, high pressure combustion reaction of the fuel charge, but will have only resulted from the cracking of the fuel molecules at the lower pressure and temperatures present in the air chamber during the exhaust stroke. Thus, along with the air in chamber 38, post-flame radical remnants from the combustion products in the exhaust gases and pre-flame radicals from crevice outgassing will be present in the chamber as a highly reactive mixture.

Upon completion of the exhaust stroke, the exhaust valve closes and the intake valve opens (with perhaps a suitable overlap to suit the particular engine requirements), and the piston begins moving away from the closed end of the cylinder bore to initiate the next intake of air into the working chamber. As shown in FIG. 12m, as the piston accelerates downwardly, an outgassing of air and radicals from the air chamber into the working chamber occurs due to the rapid piston motion and the reduced pressure in the working chamber. This produces a seeding of the incoming air with the highly reactive radical mixture in the air chamber. Since the air in the working chamber is considerably cooler than the air in the air chamber, the high temperature radicals are "quenched" and diluted, so that further reaction of the radicals in the air chamber is substantially delayed until they are reactivated during the next compression and combustion events.

In FIG. 12n the piston is approaching the end of the intake event but the fuel has not yet been introduced into the working chamber. In FIGS. 12o and 12p, the fuel has been added at the intake port area of the working chamber (for the fuel aspirated engine) to produce the desired axially stratified charge before compression begins to initiate the next cycle. As explained previously, various procedures can be used to obtain the axially stratified charge condition to avoid contamination of the air chamber with fuel except in very minor quantities (insufficient for sustained combustion).

When the next compression event begins (FIG. 12a) and proceeds to ignition (FIG. 12d), the charge is a radical seeded mixture of fresh fuel, radicals produced during heating and compression of the fresh fuel, post-flame and pre-flame radicals seeded from the previous combustion cycle and from the crevice outgassing of fuel and air at the end of the previous cycle. Ignition is thus radical enhanced so that the autoignition pressure/temperature zone is lowered in accordance with known principles, as illustrated in FIG. 14. In FIG. 14, a typical compression ignition autoignition zone 128 is shown related to pressure and temperature within the working chamber 16. Zone 130 is the radical enhanced autoignition zone and shows how radical seeding affects the autoignition zone, a phenomenon that has been extensively investigated by the Russian physicist N. N. Seminov. The shape of the radical enhanced zone 130 in fact is sometimes referred to as the "Seminov Penisula." The zone 132 below and to the left of the zones 130 will require a spark or high temperature source to initiate combustion in the conventional engine, since otherwise ignition of the charge will not normally occur. Thus, it will be seen that as long as the pressure in the working chamber is at least above the generally horizontal leg of the radical enhanced autoignition zone 130 and to the left of the vertical leg of the zone, the temperature alone of the charge will determine whether or not ignition will proceed spontaneously or only upon instigation with a spark or high temperature source. By controlling the temperature of the charge by controlling the quantity of secondary air, and by maintaining the temperature of the cap 32 below the detonation temperature, the combustion cycle in accordance with this invention can be controlled so that ignition will selectively be carried out in the autoignition or spark ignition mode. The charge temperature, in accordance with this invention, will be carried out with the temperature of the charge in the working chamber close to the radical enhanced autoignition temperature, with the ultimate precombustion temperature of the charge varied by varying the fuel-to-air ratio via control of the secondary air admitted to the working chamber. In this manner, a slight increase or decrease of the charge temperature into or out of the autoignition zone (zone 130 or zone 132) is accomplished, and the combustion cycle is carried out selectively in spark ignited or autoignition mode.

In the autoignition mode, of course, it will be noted that the cycle is a low compression ratio (5-9:1) fuel aspirated cycle. Severe detonation and knock is avoided even with gasoline fuels because of the controlled Helmholtz resonator supply of air into the combustion zone 16 from the air chamber throughout the combustion event, and the longer burn time provided by the piston and combustion chamber configuration. The type of radicals provided in the working chamber (pre-flame) is also believed to enhance the total process and permit close control of ignition on either side of the radical enhanced zone.

In the case of a fuel injected, compression ignition engine such as shown in FIG. 4, it is envisioned that optimized ignition timing can be assured by selecting a cap 32 that has a thermal coefficient and construction that yields best power for the cycle when autoignition is carried out in the radical enhanced zone 130 at low compression ratios of between 5 and 9:1. That is, a cap material and cap assembly structure is selected to have a thermal coefficient that will produce a cap temperature that, for the fuel used and the compression ratio of the engine, will result in timing of autoignition that optimizes best power for the engine.

It will be understood that this description is of a preferred embodiment(s) of the invention only and various changes to the specific structure or process described could be made by a person skilled in the art without departing from the scope of the invention, which is defined in the ensuing claims.

I claim:

1. A process for carrying out a cyclic combustion reaction of fuel and air in a variable volume bore of an internal combustion engine constituting a working chamber in which the fuel is reacted to convert chemical energy into heat energy for producing work by expansion of products of combustion against the working face of a piston reciprocable in the bore, the piston drivingly connected to a work utilization device of the engine, comprising:

(a) providing a Helmholtz resonating chamber in the piston adjacent its working face, the resonating chamber including a restricted orifice in communication with the working chamber and an enlarged volume that is large in comparison with the orifice volume in communication with the orifice, the dimensions of the enlarged volume and orifice being such that the Helmholtz resonating frequency of the resonating chamber corresponds approximately to the frequency of the shock waves generated upon initiation of combustion of the fuel in the working chamber, and all linear dimensions of the orifice and chamber are less than ¼ wavelength of said resonating frequency at the approximate temperature of the resonating chamber during combustion and expansion of the fuel in the working chamber;

(b) separately supplying air and fuel to the working chamber as a charge and transferring a portion of the air into the resonating chamber during compression of the charge;

(c) igniting and reacting the fuel and air mixture in the working chamber to produce heat and work;

(d) heating the air in the resonating chamber by heat exchange with the products of reaction;

(e) exciting the heated air in said resonating chamber at its Helmholtz resonant frequency during each combustion reaction event in the working chamber by said shock waves to cause periodic pumping of heated air from the resonating chamber into the working chamber throughout the combustion/expansion events; and (f) inducing closed organ pipe resonance of the gas in the working chamber after each initiation of the combustion reaction in the working chamber by the periodic flow of air from the resonating chamber into the working chamber through said orifice at said Helmholtz resonant frequency, said closed organ pipe resonance being induced at least when the working chamber is at or substantially near maximum volume following the combustion/expansion event.

2. The process as claimed in claim 1, wherein the periodic flow of gas from the resonating chamber is restricted to the peripheral area of the working end of the piston.

3. The process as claimed in claim 1, wherein the air in the resonance chamber is heated in step (d) by whirling same rapidly within the chamber to cause heat exchange between the piston, particularly the working face area thereof, and the air.

* * * * *

UNITED STATES PATENT AND TRADEMARK OFFICE
CERTIFICATE OF CORRECTION

PATENT NO. : 4,592,331

DATED : June 3, 1986

INVENTOR(S) : ANDREW A. POURING

It is certified that error appears in the above-identified patent and that said Letters Patent are hereby corrected as shown below:

Column 5, line 2, "areas" should be --area S--.

Column 11, line 7, "particulary" should be --particular--.

Column 17, line 67, "Penisula" should be --Peninsula--;

line 68, "zones 130" should be --zone 130--.

Signed and Sealed this

Tenth Day of February, 1987

Attest:

DONALD J. QUIGG

*Attesting Officer*      *Commissioner of Patents and Trademarks*